United States Patent [19]
Gwinn

[11] Patent Number: 6,148,734
[45] Date of Patent: Nov. 21, 2000

[54] ELASTOMERIC BEARING WITH SOFTENING SPRING RATE

[75] Inventor: James T. Gwinn, Fairview, Pa.

[73] Assignee: Lord Corporation, Cary, N.C.

[21] Appl. No.: 09/080,984

[22] Filed: May 19, 1998

[51] Int. Cl.[7] .................................................. B61F 3/00
[52] U.S. Cl. ...................................... 105/199.3; 384/423
[58] Field of Search ............................. 105/199.1, 199.3; 384/423

[56] References Cited

U.S. PATENT DOCUMENTS

| | | |
|---|---|---|
| Re. 27,318 | 3/1972 | Gensheimer ................................. 61/48 |
| 2,622,836 | 12/1952 | Lee .......................................... 248/358 |
| 3,280,970 | 10/1966 | Henshaw ..................................... 206/46 |
| 3,556,503 | 1/1971 | Van Moss, Jr. .............................. 267/3 |
| 3,600,047 | 8/1971 | MacDonnell ............................. 308/138 |
| 3,653,331 | 4/1972 | Chierici ................................ 105/199 R |
| 3,762,339 | 10/1973 | Dwyer ............................... 105/199 CB |
| 3,796,167 | 3/1974 | Van Moss, Jr. ................... 105/199 CB |
| 3,798,916 | 3/1974 | Schwemmer ................................ 61/48 |
| 3,948,501 | 4/1976 | Schwemmer ............................. 267/140 |
| 3,957,318 | 5/1976 | Wiebe ..................................... 308/138 |
| 3,961,584 | 6/1976 | Paton et al. ......................... 105/182 R |
| 4,090,750 | 5/1978 | Wiebe ..................................... 308/138 |
| 4,198,037 | 4/1980 | Anderson ................................ 267/153 |
| 4,319,539 | 3/1982 | Fujii et al. . |
| 4,566,678 | 1/1986 | Anderson ............................. 267/141.1 |
| 4,712,487 | 12/1987 | Carlson ................................. 105/199.3 |
| 4,793,720 | 12/1988 | Merker, Jr. ............................... 384/423 |
| 4,924,779 | 5/1990 | Curtis et al. ............................. 105/4.1 |
| 4,998,997 | 3/1991 | Carlston ...................................... 267/3 |
| 5,054,414 | 10/1991 | Yamaguchi ............................... 114/219 |
| 5,322,131 | 6/1994 | Pressley et al. ....................... 173/162.1 |
| 5,454,330 | 10/1995 | Rhen . |
| 5,601,031 | 2/1997 | Carlson ................................. 105/199.3 |

FOREIGN PATENT DOCUMENTS

WO 94/16864   8/1994   WIPO .

OTHER PUBLICATIONS

Kownacki, W. et al., *Buckling of Rubber Columns Having Shims*; A Thesis Submitted to the Faculty of the College of Engineering in Partial Fulfillment of the Requirements for the Degree of Bachelor of Mechanical Engineering, The University of Detroit (May, 1960).

*Primary Examiner*—S. Joseph Morano
*Assistant Examiner*—Robert J. McCarry, Jr.
*Attorney, Agent, or Firm*—Randall S. Wayland; Michael M. Gnibus; James W. Wright

[57] ABSTRACT

A railway car side bearing includes a lower housing member, an upper housing member spaced apart from the lower housing member, and an elastomeric spring member interposed between the upper and lower housing members that buckles upon application of vertical loading to provide a spring rate that softens within a range of compressive loads. The upper and lower housing members cooperate with each other to allow for relative vertical movement therebetween, but restrain lateral and rotational movement therebetween. The elastomeric spring member has a first set of spring rates when subjected to axial loads within a first range. However, when the side bearing is subjected to axial loads within an second range, the elastomeric spring member buckles and exhibits a second set of substantially softer spring rates.

31 Claims, 8 Drawing Sheets

ELASTOMERIC BEARING WITH SOFTENING SPRING RATE

FIELD OF THE INVENTION

The present invention relates generally to railway cars and, more particularly, to side bearings connecting railway car bodies to railway car truck bolsters.

BACKGROUND OF THE INVENTION

A railway car conventionally includes a car body supported on the center plates of a pair of longitudinally spaced trucks. The conical-shaped wheels of the trucks engage the respective rails of a railway track. The trucks travel a generally sinuous path along the track as the respective wheels continuously seek a centered position on a respective rail. In traveling such a sinuous path, a railway truck tends to hunt, i.e., yaw or oscillate about a vertical axis of the truck. One side frame of a truck tends to move ahead of the other which, in turn, results in the flanges of the wheels striking and rubbing against the rails, first on one side, and then on the other. Such undesirable lateral oscillations may cause excessive wheel and track wear. In addition, unstable truck hunting responses can develop if the frequency of the cyclic motion approaches resonance.

Also, during travel of a railway car, a railway car body may have the tendency to rock, i.e., oscillate about a horizontal (or roll) axis of the railway car body, independent of the truck upon which the railway car body is mounted. As the trucks of a railway car negotiate their sinuous path of travel along a railway track, the car body may move laterally in concert with the cyclic lateral movement of the truck center plates. A loaded or heavy car may tolerate such lateral oscillation. However, an empty or light car body may rock from side to side which can become dangerous should the frequency of the rocking approach resonance.

Efforts to control truck hunting and car body rocking include the use of side bearings which are mounted to a truck bolster on opposite sides of the center plate. For example, see U.S. Pat. No. 4,712,487 to Carlson, U.S. Pat. No. 4,090,750 to Wiebe, and U.S. Pat. No. 3,762,339 to Dwyer. Conventional side bearings are configured to maintain frictional contact between a truck and a car body. As the truck yaws, an upper portion of a side bearing slides across the underside of the railway car body. The resulting friction produces an opposing torque which acts to prevent yaw motion.

Conventional side bearings are stiff in both shear and compression and have a compressive spring rate that generally increases (i.e., becomes stiffer) with an increase in load. Unfortunately, as the weight of a railway car becomes excessive on a side bearing on one side of a railway car truck, excessive shear forces, caused by friction between the side bearing and the car body, may result which may restrain the truck from being able to pivot on a curved track. Such restraint of movement may cause the truck wheels to wear and may cause the track rails to wear. The foregoing illustrates limitations known to exist in present devices and methods. Thus it is apparent that it would be advantageous to provide an alternative directed to overcoming one or more of the limitations set forth above. Accordingly, a suitable alternative is provided including features more fully disclosed hereinafter.

SUMMARY OF THE INVENTION

In view of the above discussion, it is an object of the present invention to allow movement of a railway car body relative to a supporting truck while also reducing truck hunting.

It is another object of the present invention to reduce the tendency of railway car bodies to rock.

It is another object of the present invention to reduce wear on railway tracks and railway truck wheels caused by truck hunting.

These and other objects of the present invention are provided by a railway car side bearing including a lower housing member, an upper housing member spaced apart from the lower housing member along an axial direction, and an elastomeric spring member interposed between the upper and lower housing members that is configured to buckle upon the application of a selected range of axial loads. The elastomeric spring member has an unbuckled condition providing a first set of spring rates over a selected first range of axial loads and a buckled condition providing a second set of spring rates over a selected second range of axial loads. The spring rates within the second set are softer than the spring rates within the first set. The upper and lower housing members cooperate with each other to allow for relative axial movement therebetween. However, lateral movement between the upper and lower housing members is substantially restrained. Preferably, rotational movement is also substantially restrained.

A side bearing according to a specific embodiment of the present invention includes a lower housing, an upper housing, and an annular spring assembly disposed between the upper and lower housings. The lower housing includes a pedestal extending from a central portion of a side thereof along an axial direction. The upper housing includes an annular wall depending from a central portion of a side thereof. The annular wall is positioned around and telescopically engages the pedestal of the lower housing portion. The annular spring assembly disposed between the upper and lower housings encircles the pedestal and annular wall and shields the pedestal and annular wall from dirt, water and ice. The upper and lower housing members cooperate with each other to allow for relative vertical movement therebetween. However, lateral and rotational movement between the upper and lower housing members is substantially restrained.

The spring assembly includes an annular top plate, an annular base plate, and an annular elastomeric spring. The annular elastomeric spring is sandwiched between opposing top and bottom annular plates and has either an inner or outer circumferential surface with a concave contour. The top and bottom annular plates are configured to be received within respective annular grooves in the lower and upper housing members.

The concave configuration of the inner or outer circumferential surfaces facilitates buckling of the elastomeric spring when subjected to axial loads above a selected threshold. Up to a selected threshold axial load, the elastomeric spring compresses without buckling and exhibits a first set of spring rates. Typically, these spring rates are of increasing stiffness as axial loading increases. Upon reaching a threshold axial load, the elastomeric spring buckles and then exhibits a second set of spring rates that are softer than the spring rates within the first set for axial loads greater than the threshold. Because of the softer spring rates when in a buckled condition, the elastomeric spring can deflect sufficiently to allow loads from a railway car body to be distributed substantially evenly on both side bearings mounted to a truck bolster.

The present invention is advantageous over conventional side bearings because the decreased spring rate produced by the elastomeric member can become softer by a factor of three or more within a predetermined axial load range. By contrast, elastomeric members or springs within conventional side bearings typically become stiffer as axial loads increase. Accordingly, with conventional side bearings, a point is often reached where deflection stops under application of normal operating loads. By contrast, side bearings configured according to the present invention become softer within a predetermined operating load range to provide deflection throughout the operating load range. The ability of the present invention to provide soft spring rates for selected axial load ranges facilitates equalizing the forces upon two side bearings on a truck. The equalization of forces on both side bearings of a truck helps dampen out truck hunting while providing constant contact with a car body to reduce car body rocking. The foregoing and other aspects will become apparent from the following detailed description of the invention when considered in conjunction with the accompanying drawing figures.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
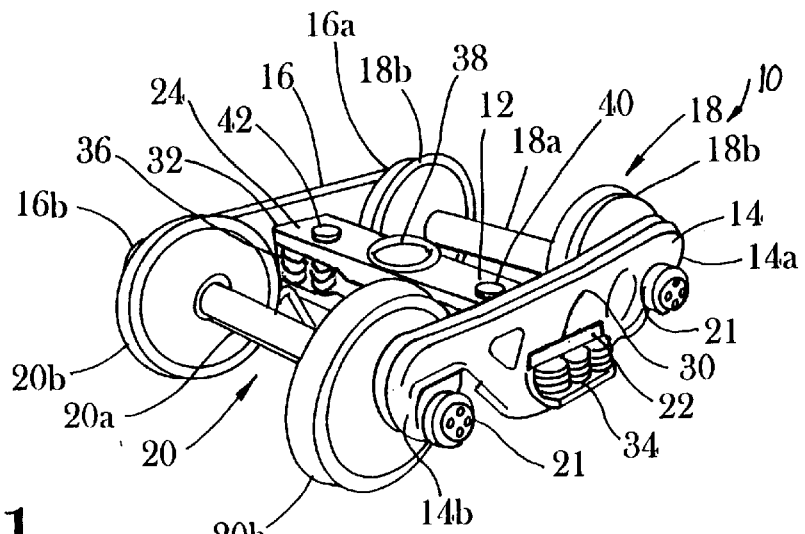
FIG. 1 illustrates a conventional railway car truck.

Referring now to FIG. 1, a railway car truck 10 including side bearings according to an embodiment of the present invention is illustrated. The illustrated truck 10 includes a bolster 12 extending between opposing side frames 14, 16. The ends 14a, 14b, 16a, 16b of each respective side frame 14, 16 are connected to respective wheelsets 18, 20. Each wheelset 18, 20 includes a respective axle 18a, 20a with two wheels 18b, 20b mounted thereto, as illustrated. Bearings 21 are connected to the journal ends of the respective axles 18a, 20a outside of the wheels 18b, 20b, as illustrated. The opposing ends 22, 24 of the bolster 12 are received in respective window openings 30, 32 of the side frames 14, 16. The side frames 14, 16 support the bolster 12 through respective spring assemblies 34, 36 which are configured to reduce dynamic forces produced as the truck 10 travels along a track, thereby providing a smooth ride.

As is known to those skilled in this art, a railway car body is connected to a centerplate 38 of the bolster 12 via a kingpin which allows the car body to pivot on the truck 10 as the truck travels along a curved section of track. A pair of side bearings 40, 42, according to the present invention are provided on respective sides of the centerplate 38, as illustrated. Each side bearing 40, 42 is securely mounted to the bolster 12 and maintains constant frictional contact with a railway car body, typically via wear plates mounted to the underside of the railway car body. The frictional contact, however, is not of sufficient magnitude to prevent relative movement between the car body and the truck bolster 12.

Figure 2:
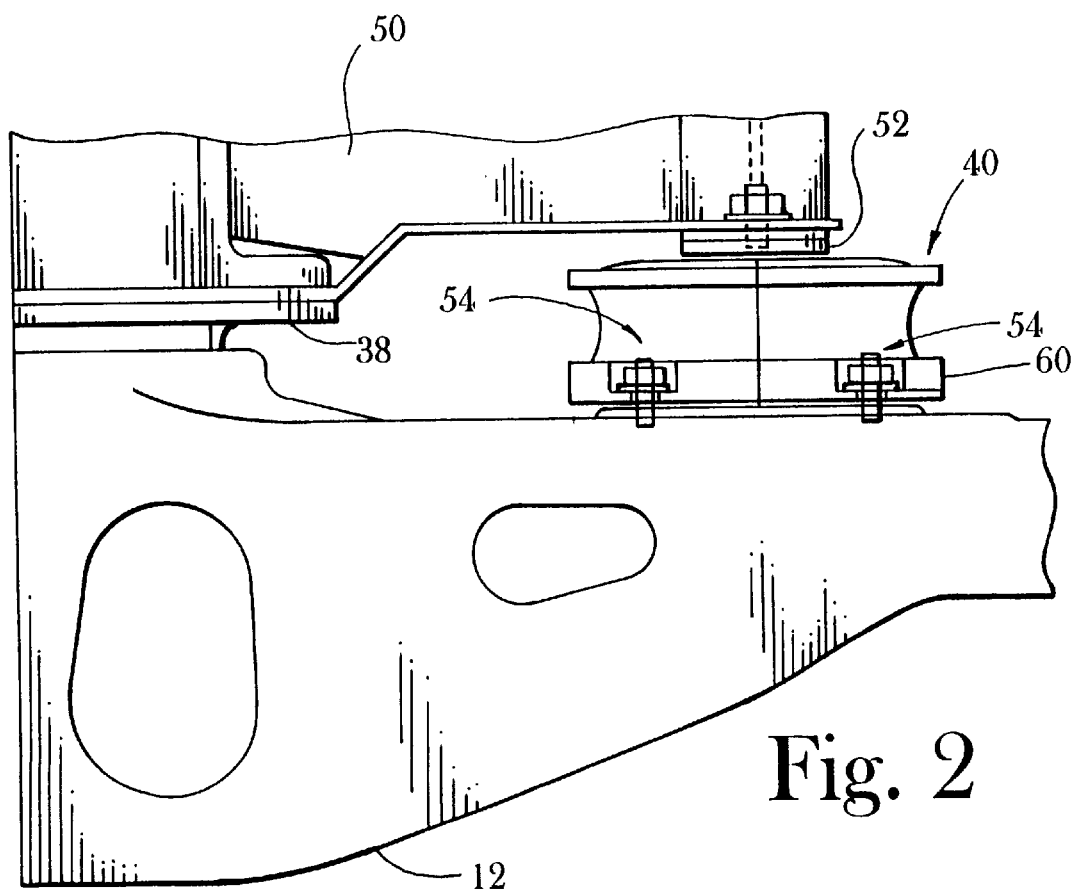
FIG. 2 is an enlarged partial forward looking elevational view of a railway car assembly having a side bearing assembly according to an embodiment of the present invention disposed between the car body and truck bolster.

Referring now to FIG. 2, a partial frontal elevational view of a truck bolster 12 having a side bearing assembly 40 mounted thereto, according to the present invention, is illustrated. A car frame 50 and body (not shown) supported by the bolster 12 via the centerplate 38 and side bearing assemblies 40, 42 positioned on opposite sides of the centerplate 38. It is noted that only side bearing assembly 40 is illustrated in FIG. 2. A wear plate 52 is connected to the car frame 50, as illustrated, for frictional engagement with the top (or upper) portion of the side bearing assembly 40. The side bearing assembly 40 is preferably mounted to the bolster via a plurality of bolts 54 or studs with nuts which extend through the bottom (or lower) housing 60 thereof as illustrated. Other mounting configurations could be used as well.

Figure 3:
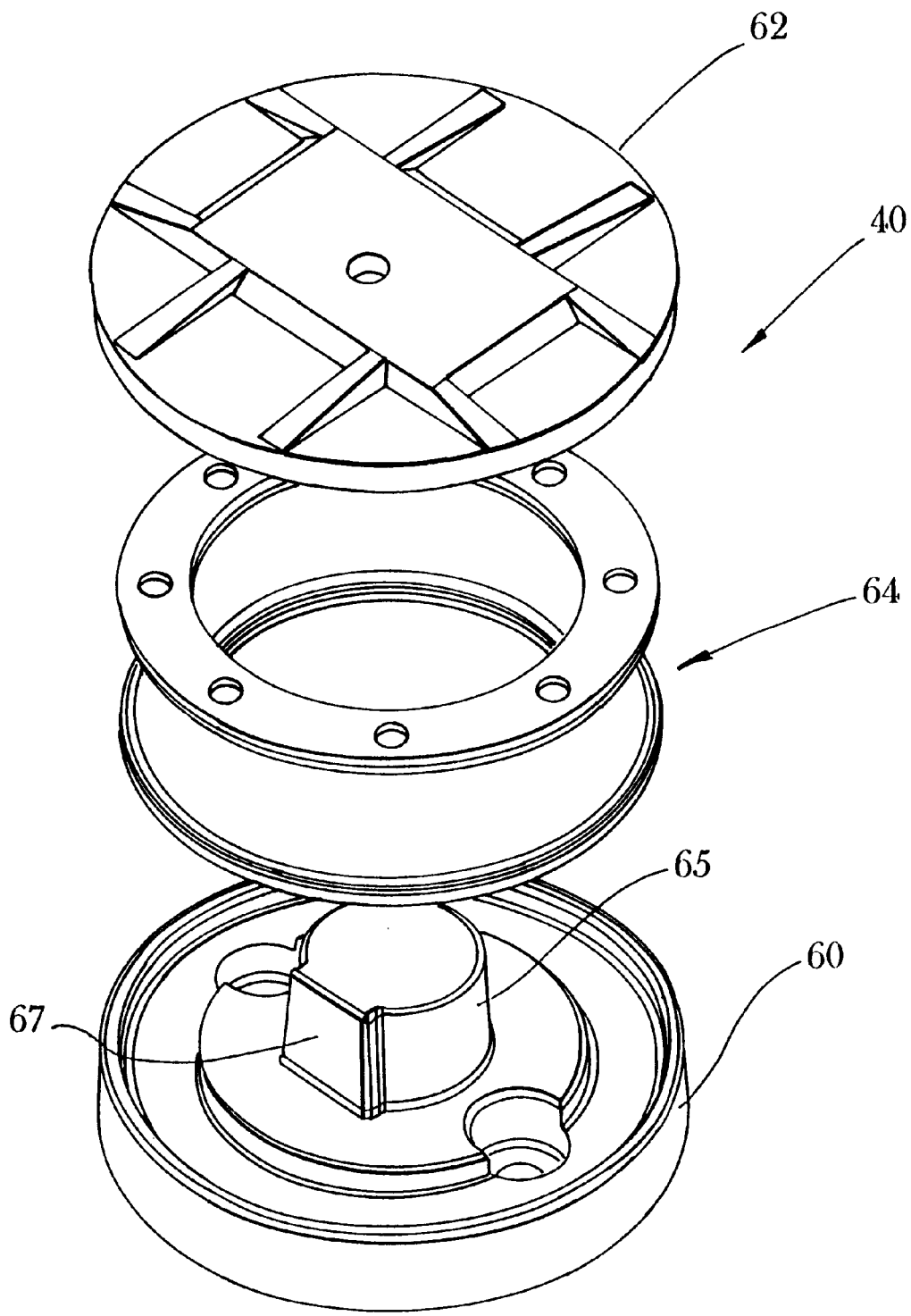
FIG. 3 is an exploded perspective view of a side bearing according to an embodiment of the present invention.

Referring now to FIG. 3, an exploded perspective view of a side bearing assembly, according to an embodiment of the present invention, is illustrated. It is preferred that identical side bearing assemblies are utilized on opposite sides of a truck bolster centerplate. Accordingly, only one side bearing assembly will be described in detail below. The illustrated side bearing assembly 40 includes a lower housing member 60, an upper housing member 62 spaced apart from the lower housing member 60 in an axial direction (indicated by arrow 61), and an elastomeric spring assembly 64 interposed between the lower and upper housing members 60, 62. A pedestal 65 extending from the lower housing member 60 is configured to engage and cooperate with an annular wall (not shown) depending from the upper housing member 62.

Figure 4:
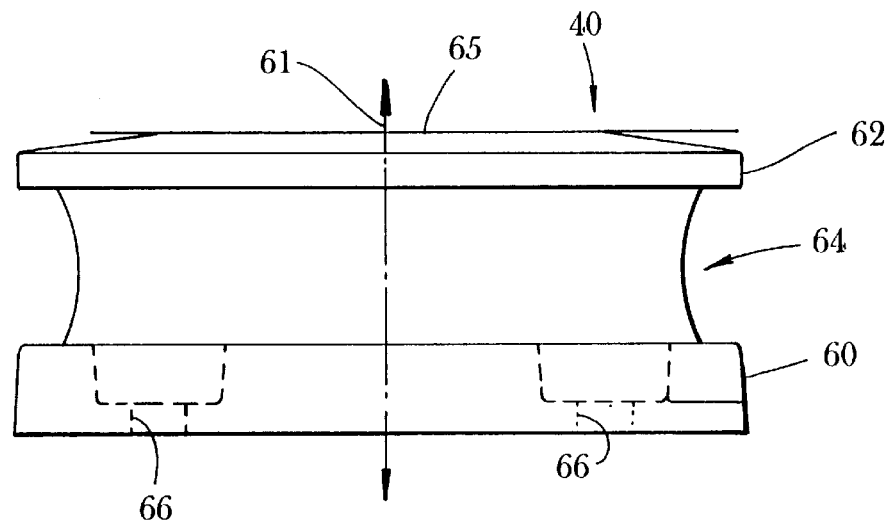
FIG. 4 is a side elevational view of a side bearing according to an embodiment of the present invention.

Referring now to FIGS. 4 and 5 the side bearing assembly 40 of FIG. 3 in an assembled configuration will be described in detail. The elastomeric spring assembly 64 is sandwiched between the lower and upper housing members 60, 62 as illustrated. The lower and upper housing members 60, 62 preferably are not secured together but, rather, are maintained in an assembled configuration by the weight of a railway car body on the upper housing member 62.

The elastomeric spring assembly 64 is configured to buckle upon the application of compressive forces within a given range so as to decrease an initial stiff spring rate to a softer spring rate, as will be described in detail below. The upper housing member 62 includes a generally flat outer surface 65 that serves as a wear pad for frictionally engaging a wear pad (52 FIG. 2) secured to a car body. The lower housing member 60 includes a plurality of apertures 66 for receiving bolts (54 FIG. 2) therethrough for attaching the side bearing assembly 40 to a truck bolster (12 FIG. 2). Preferably, the lower and upper housing members 60, 62 are formed from durable materials such as steel, aluminum, cast iron, and the like.

Figure 5A:
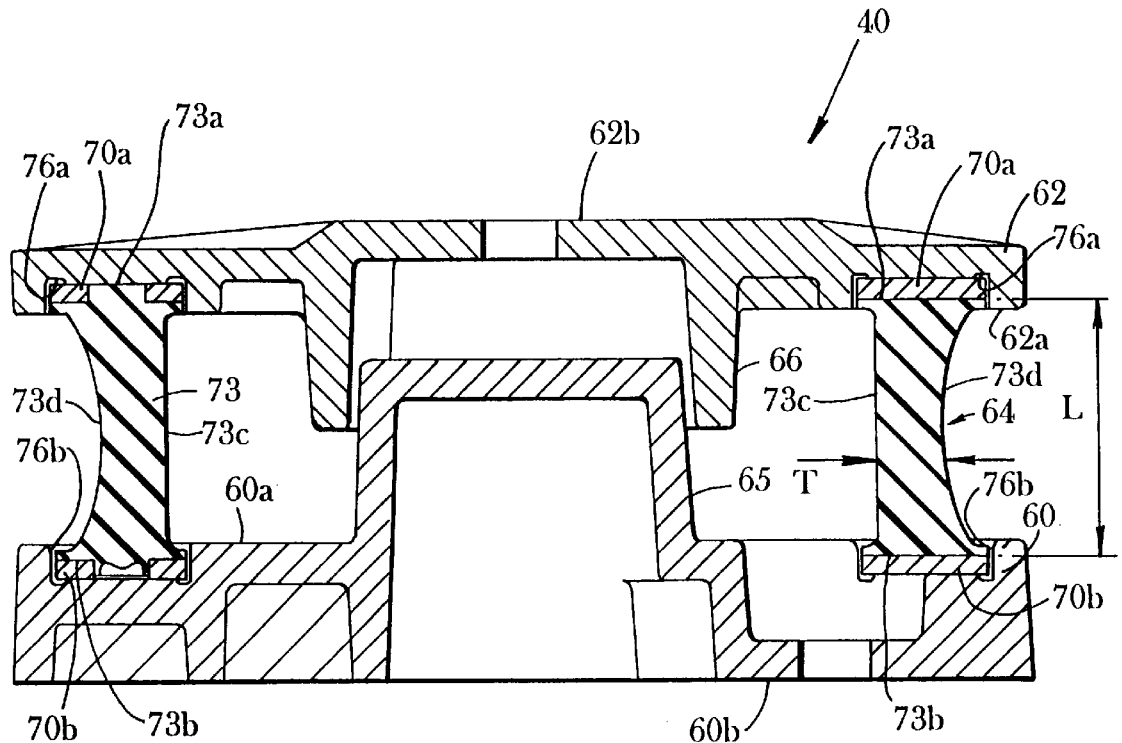
FIG. 5A is a side cross-sectional view of a side bearing according to an embodiment of the present invention.

Referring now to FIG. 5A, a cross-sectional view of the side bearing assembly 40 of FIG. 4 is illustrated. The lower housing member 60 includes opposing first and second sides 60a, 60b. The first side 60a includes a pedestal 65 extending from a central portion thereof, as illustrated. The upper housing member 62 also includes opposing first and second sides 62a, 62b. The upper housing first side 62a includes an annular wall 66 depending therefrom. The annular wall 66 is configured to surround and telescopically cooperates with the pedestal 65 extending from the lower housing first side 60a.

Preferably, the annular wall 66 and pedestal 65 have a mating configuration that substantially limits lateral and rotational motion between the lower and upper housing members 60, 62, but allows vertical movement therebetween. As shown in FIG. 3, according to one embodiment of the present invention, the pedestal 65 has a generally cylindrical configuration with a flat face 67 along a portion thereof. The flat face 67 serves as a key and is configured to matingly engage a corresponding aperture or slot 68 within the annular wall 66 of the upper housing member 62. This slot and key configuration substantially limits rotation and other lateral motion of the lower and upper housing members 60, 62 relative to each other.

Together, the annular wall 66 and pedestal 65 serve as means for restraining relative lateral motions between the lower and upper housing members 60, 62, while allowing relative vertical motions between the lower and upper housing members. However, the present invention is not limited to the illustrated embodiment. The pedestal 65 may have a rectangular or other non-circular configuration. The annular wall 66 may have a matching configuration such that vertical movement of the lower and upper housing members is possible, but lateral and rotational movement is restrained.

Still referring to FIG. 5A, the elastomeric spring assembly 64 is disposed between the lower and upper housing members 60, 62 and encircles the pedestal 65 and annular wall 66, as illustrated. The elastomeric spring assembly 64 serves as a barrier to prevent dirt and ice from affecting the vertical movement between the pedestal 65 and the annular wall 66. Furthermore, the configuration of the side bearing assembly 40 permits visual inspection of the elastomeric spring assembly 64 without requiring the detrucking of a railway car.

The elastomeric spring assembly 64 includes an annular top plate 70a, an annular base plate 70b, and an annular elastomeric spring member 73. The annular elastomeric spring member 73 includes opposing top and bottom surfaces 73a, 73b and opposing inner and outer circumferential surfaces 73c, 73d. The top surface 73a is connected, preferably by bonding, to the top annular plate 70a and the bottom surface is connected to the bottom annular plate 70b, as illustrated. In the illustrated embodiment, the outer circumferential surface 73d has a concave contour prior to being compressed to facilitate buckling when the elastomeric spring assembly 64 is subjected to a predetermined range of compressive forces.

The length between the top and bottom surfaces 73a, 73b is defined as L, and the length or thickness of the elastomeric spring member 73 is defined as T. Preferably, buckling of the elastomeric spring member 73 occurs the ratio of L/T is greater than about 2.

Figure 5B:
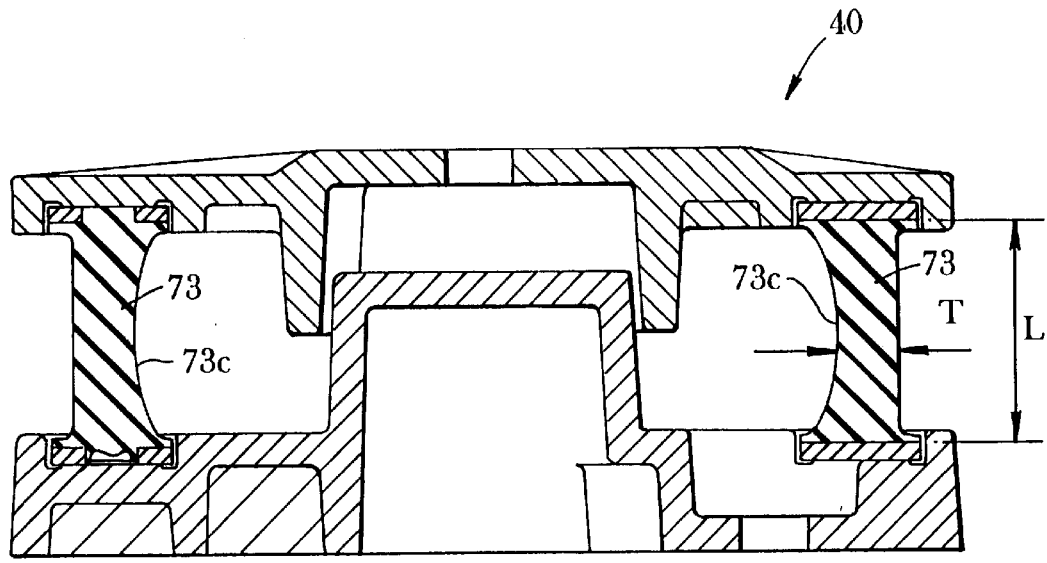
FIG. 5B is a side cross-sectional view of an elastomeric spring member having an inner circumferential surface with a concave configuration according to an embodiment of the present invention.
Figure 5C:
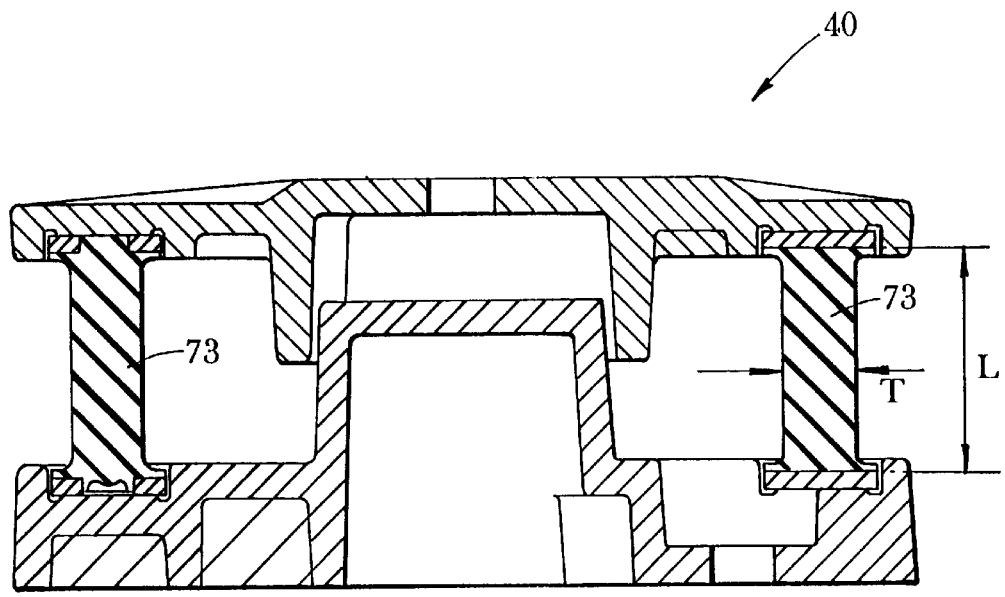
FIG. 5C is a side cross-sectional view of an elastomeric spring member devoid of surfaces having a concave configuration according to an embodiment of the present invention.

The present invention is not limited to the illustrated configuration of the elastomeric spring assembly 64. Various types of elastomeric spring members that buckle within a predetermined axial load range may be utilized. For example, the inner circumferential surface 73c of the elastomeric spring member 73 may have a concave configuration as shown in FIG. 5B. Moreover, the elastomeric spring member 73 may be devoid of a concave contour as shown in FIG. 5C. Additionally, an elastomeric spring member for a side bearing according to the present invention need not have an annular configuration. Alternatively, one or more elastomeric spring members having the ability to buckle within a predetermined range of axial loads may be utilized regardless of shape, size or configuration.

Preferably, the annular elastomeric spring member 73 is formed from natural or synthetic rubber. Various other elastomeric or flexible materials may be utilized that fall within a Shore A (Type A) durometer range of between about 35 and about 75. As is known to those skilled in the art, a durometer is an international standard for the hardness measurement of rubber, plastic and other non-metallic materials. Durometers are described in the American Society for Testing and Material specification ASTM D2240. In addition, elastomeric material may be utilized that is especially suitable for severe oil and temperature environments as well as other types of environments.

As illustrated in FIG. 5A, the upper housing member 62 includes an annular groove 76a extending around and substantially concentric with the annular wall 66. The upper housing annular groove 76a is configured to receive the top annular plate 70a of the elastomeric spring assembly 64. The lower housing member 60 includes an annular groove 76b extending around and substantially concentric with the pedestal 65. The lower housing annular groove 76b is configured to receive the bottom annular plate 70b of the elastomeric spring assembly 64, as illustrated.

Figure 6:
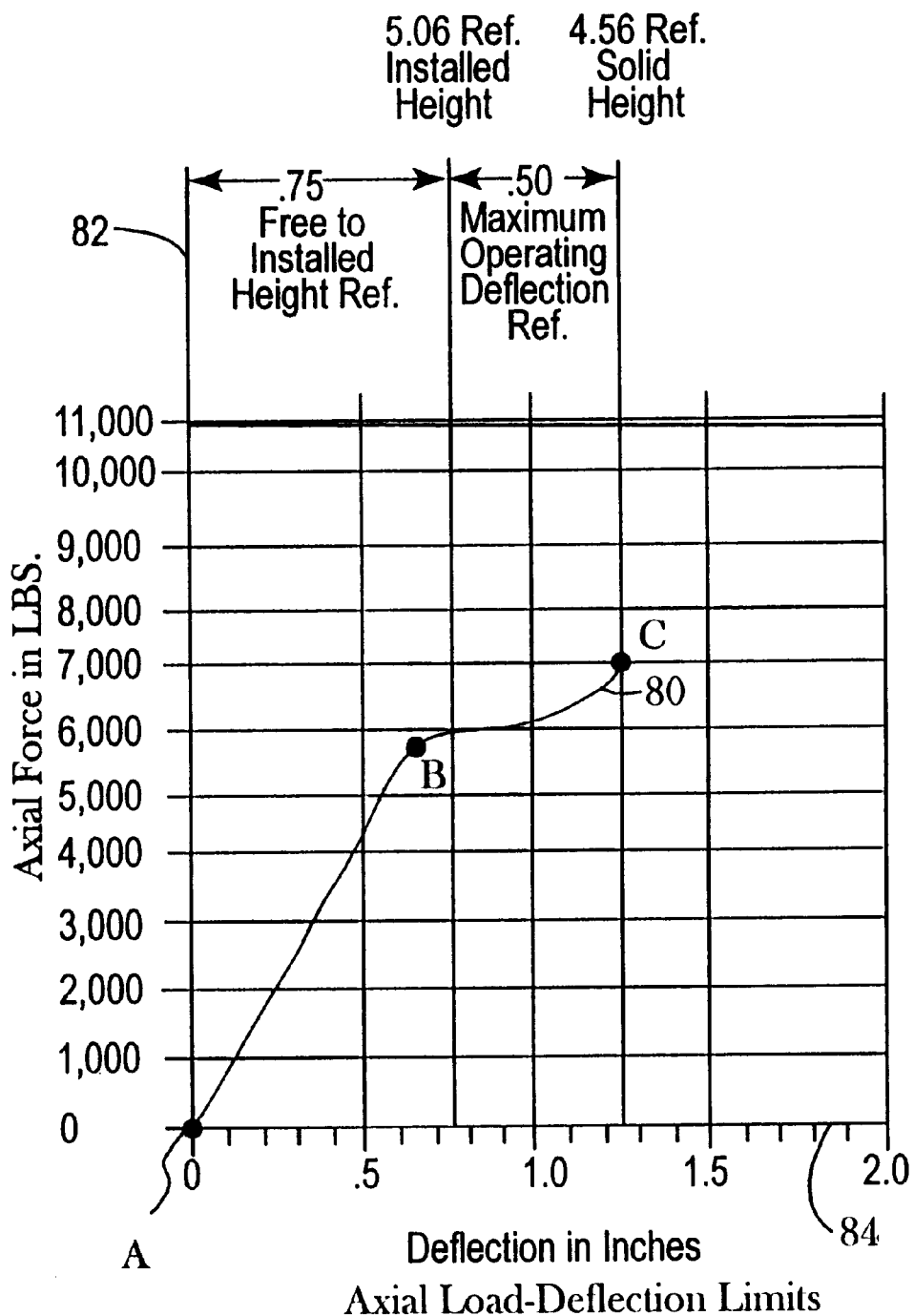
FIG. 6 is an exemplary load-deflection curve illustrating the spring rate characteristics of a side bearing according to an embodiment of the present invention.

Referring now to FIG. 6, an exemplary load-deflection curve 80 illustrates the spring rate characteristics of a side bearing according to an embodiment of the present invention. Axial load (or force) in pounds (lbs) is plotted along the Y axis 82 and axial deflection in inches is plotted along the X axis 84. As the side bearing is compressed in an unbuckled condition via axial loads, the elastomeric spring member exhibits spring rates within a first set. The spring rates in this first set are indicated by the slope of the curve 80 at each point between point A and point B. The axial loads between point A and point B correspond to a first range of axial loads from about 0 pounds (lbs) to about 6,000 lbs. The threshold axial load where the elastomeric spring member begins to buckle is point B. The corresponding axial deflection of the side bearing up to the threshold (point B) is about 0.60 inches. The elastomeric member continues to buckle as axial loads are increased above the threshold. The spring rates of the elastomeric spring member from point B to point C are substantially softer, as illustrated by the flatter slope of the curve 80 between point B and point C. The elastomeric spring member deflects up to an additional 0.50 inches with little additional loading, as illustrated. While conventional side bearings exhibit spring rates of increasing stiffness (the slope of the curve) as axial loads are increased, the present invention actually decreases spring rate stiffness at and above a threshold axial load.

The present invention is not limited to the ranges of loads and deflections illustrated in FIG. 6. Various load ranges may be utilized. For example, the threshold (point B) of curve 80 can vary up or down depending on a variety of factors, such as the type of wear plate incorporated by a side bearing. Furthermore, an elastomeric spring member can be designed to buckle within various load ranges and to have various deflection ranges. Preferably, most of the axial loads experienced by a side bearing during operation are within the range between point B and point C. Because of the decreased spring rate between point B and point C, loads can be equally distributed to both side bearings on a truck bolster, even when increased loads are applied to one side of a truck bolster. As a result, the tendency of the truck to hunt can be reduced. It should be understood that the spring assembly 64 is buckled in the as-installed state.

Figure 7:
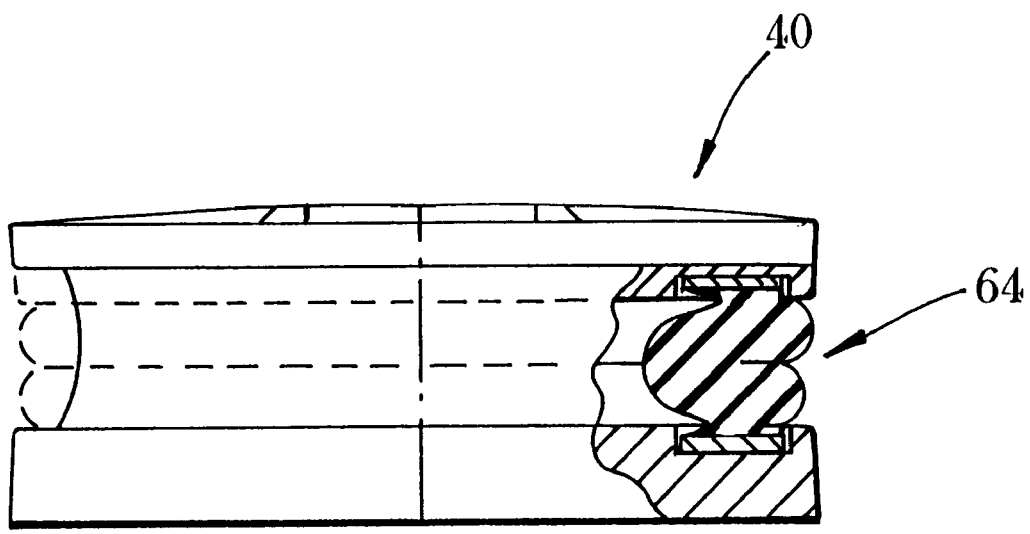
FIG. 7 illustrates the deflected shape of the elastomeric spring assembly of the side bearing of FIG. 4 during buckling.

Referring now to FIG. 7, the contour of the elastomeric spring assembly 64 of FIG. 4 is illustrated in a buckled state as a result of axial loads that exceed a threshold value (i.e., above point B of curve 80 in FIG. 6). As described above, when in the buckled condition, the elastomeric spring assembly 64 has a spring rate softer than a spring rate prior to buckling. The illustrated buckled condition of the elastomeric spring assembly 64 corresponds to the portion of the curve 80 between points B and C illustrated in FIG. 6.

Figure 8A:
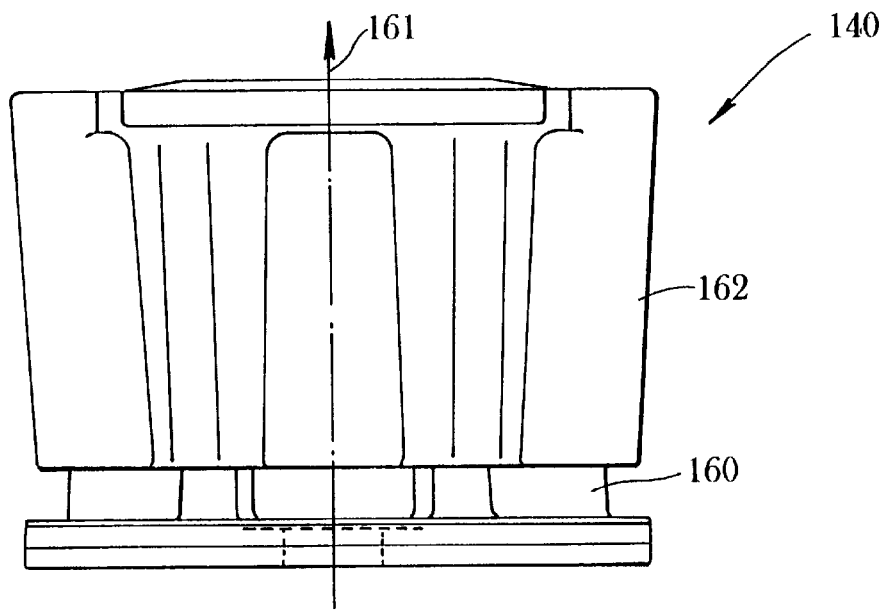
FIGS. 8A–8C illustrate side, partially sectioned side and top views, respectively, of a railway car side bearing according to another embodiment of the present invention.
Figure 8B:
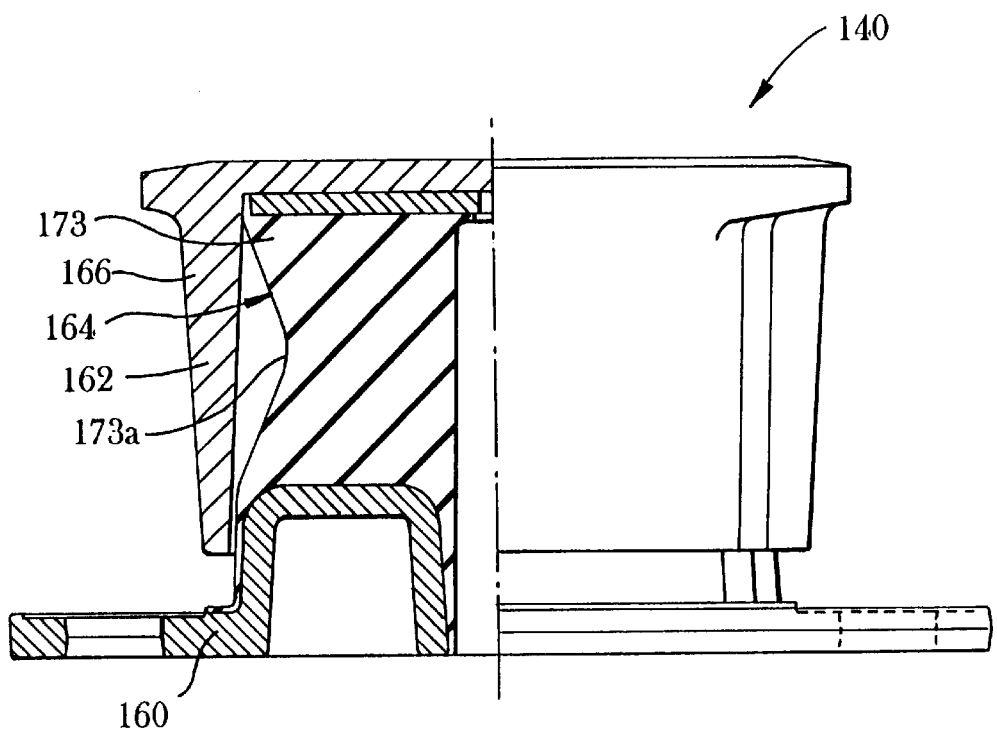
Figure 8C:
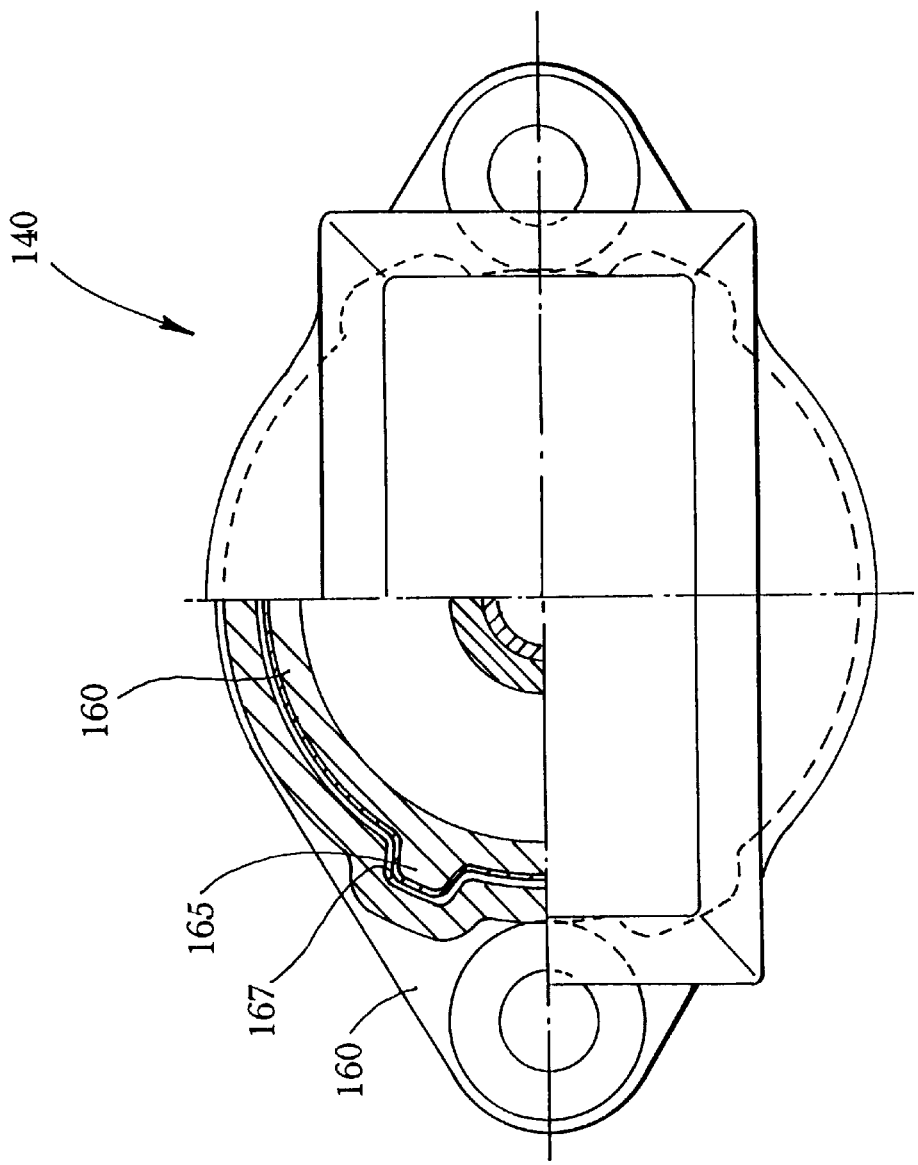

Referring now to FIGS. 8A–8C, a railway car side bearing 140 according to another embodiment is illustrated. The illustrated side bearing 140 includes a lower housing member 160, an upper housing member 162 spaced apart from the lower housing member 160 along an axial direction (indicated by arrow 161), and an elastomeric spring assembly 164 (FIG. 8B) interposed between the lower and upper housing members 160, 162. The upper housing member 162 includes an annular wall 166 that is configured to enclose the elastomeric spring assembly 164, as illustrated. As illustrated in FIG. 8C, means for substantially restraining rotational and lateral movement between the lower and upper housing members 160, 162 are provided by one or more projections 165 in the lower housing member 160 cooperating with respective receiving portions 167 in the upper housing 162. The elastomeric spring assembly 164 includes an annular spring member 173 with an outer surface 173a having a concave contour. The annular spring member 173 is configured to buckle inwardly at a threshold axial load level as described in detail above. Above the threshold axial load level, the annular spring member 173 exhibits spring rates substantially softer than spring rates prior to the threshold level.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. An elastomeric bearing, comprising:

a lower member;

an upper member spaced along an axial direction from said lower member;

means, cooperative between said upper and lower members, for restraining relative lateral motions between said upper and lower members while allowing relative axial motions between said upper and lower members; and an elastomeric member interposed between said upper and lower members, said elastomeric member having an unbuckled condition providing a first set of spring rates over a selected first range of axial loads and a buckled condition providing a second set of spring rates over a selected second range of axial loads, wherein said spring rates within said second set are softer than said spring rates within said first set.

2. An elastomeric bearing according to claim 1 wherein said restraining means comprises:

a projection extending from said lower member along said axial direction; and a receiving portion in said upper member configured to cooperate with said projection.

3. An elastomeric bearing according to claim 1 wherein said spring rates within said second set are softer than said spring rates within said first set by a factor of at least three.

4. An elastomeric bearing according to claim 1 wherein said first range of axial loads is from about 0 lbs to about 7,000 lbs.

5. An elastomeric bearing according to claim 1 wherein said second range of axial loads is from about 4,000 lbs to about 9,000 lbs.

6. An elastomeric bearing according to claim 1 wherein said elastomeric member deflects up to about 0.75 inches without buckling when subjected to axial loads within said first range of axial loads.

7. An elastomeric bearing according to claim 1 wherein said elastomeric member deflects in a buckled condition up to about 0.50 inches when subjected to axial loads within said second range of axial loads.

8. An elastomeric bearing according to claim 1 wherein said elastomeric member comprises natural or synthetic rubber.

9. An elastomeric bearing according to claim 1 wherein said elastomeric member has a hardness characterized by a Shore A durometer range of between about 35 and 75.

10. An elastomeric bearing, comprising:

a lower member;

an upper member spaced along an axial direction from said lower member;

means, cooperative between said upper and lower members, for restraining relative lateral motions between said upper and lower members while allowing relative axial motions between said upper and lower members; and an elastomeric member interposed between said upper and lower members, said elastomeric member having an unbuckled condition providing a first set of spring rates over a first range of axial loads of between about 0 lbs to about 7,000 lbs and a buckled condition providing a second set of spring rates over a second range of axial loads of between about 4,000 lbs to about 9,000 lbs, wherein said spring rates within said second set are softer than said spring rates within said first set by a factor of at least three.

11. An elastomeric bearing according to claim 10 wherein said restraining means comprises:
   a projection extending from said upper member along said axial direction; and
   a receiving portion in said lower member configured to cooperate with said projection.

12. An elastomeric bearing according to claim 10 wherein said elastomeric member deflects up to about 0.75 inches without buckling when subjected to axial loads within said first range of axial loads.

13. An elastomeric bearing according to claim 10 wherein said elastomeric member deflects in a buckled condition up to about 0.50 inches when subjected to axial loads within said second range of axial loads.

14. An elastomeric bearing according to claim 10 wherein said elastomeric member comprises natural or synthetic rubber.

15. An elastomeric bearing according to claim 10 wherein said elastomeric member has a hardness characterized by a Shore A durometer range of between about 35 and 75.

16. A railway car side bearing, comprising:
   a lower housing comprising opposing first and second sides, said first side including a pedestal extending from a central portion thereof along an axial direction;
   an upper housing comprising opposing first and second sides, said upper housing first side including an annular wall depending therefrom, said annular wall positioned around and telescopically engaging said pedestal of said lower housing portion, wherein the telescoping engagement between the pedestal and annular wall restrains relative lateral motions between said upper and lower members and allows relative axial motions between said upper and lower members; and
   an annular spring assembly disposed between said upper and lower housings and encircling said pedestal and annular wall, said spring assembly comprising:
      an annular top plate;
      an annular base plate; and
      an annular elastomeric spring including opposing top and bottom surfaces and opposing inner and outer circumferential surfaces between said top and bottom surfaces, wherein said top surface is connected to said top annular plate and said bottom surface is connected to said bottom annular plate, and wherein at least one of said outer and inner circumferential surfaces has a concave contour.

17. A railway car side bearing according to claim 16 wherein said elastomeric spring has an unbuckled condition providing a first set of spring rates over a selected first range of axial loads and a buckled condition providing a second set of spring rates over a selected second range of axial loads, wherein said spring rates within said second set are softer than said spring rates within said first set.

18. A railway car side bearing according to claim 17 wherein said spring rates within said second set are softer than said spring rates within said first set by a factor of at least three.

19. A railway car side bearing according to claim 17 wherein said first range of axial loads is from about 0 lbs to about 7,000 lbs.

20. A railway car side bearing according to claim 17 wherein said second range of axial loads is from about 4,000 lbs to about 9,000 lbs.

21. A railway car side bearing according to claim 17 wherein said elastomeric spring deflects up to about 0.75 inches without buckling when subjected to axial loads within said first range of axial loads.

22. A railway car side bearing according to claim 17 wherein said elastomeric spring deflects in a buckled condition up to about 0.50 inches when subjected to axial loads within said second range of axial loads.

23. A railway car side bearing according to claim 16, wherein said lower housing first side includes a first annular groove extending around said pedestal and configured to receive said spring assembly bottom annular plate therein.

24. A railway car side bearing according to claim 16, wherein said upper housing first side includes a second annular groove extending around said annular wall and configured to receive said spring assembly top annular plate therein.

25. A railway car side bearing according to claim 16, wherein said pedestal has a rectangular cross section.

26. A railway car side bearing according to claim 16 wherein said elastomeric spring comprises natural or synthetic rubber.

27. A railway car side bearing according to claim 16 wherein said elastomeric spring has a hardness characterized by a Shore A durometer range of between about 35 and 75.

28. A railway car side bearing, comprising:
   a lower housing comprising opposing first and second sides, said first side including a pedestal extending from a central portion thereof along an axial direction;
   an upper housing comprising opposing first and second sides, said upper housing first side including an annular wall depending therefrom, said annular wall positioned around and telescopically engaging said pedestal of said lower housing portion, wherein the telescoping engagement between the pedestal and annular wall restrains relative lateral motions between said upper and lower members and allows relative axial motions between said upper and lower members; and
   an annular spring assembly disposed between said upper and lower housings and encircling said pedestal and annular wall, said spring assembly comprising:
      an annular top plate;
      an annular base plate; and
      an annular elastomeric spring including opposing top and bottom surfaces and opposing inner and outer circumferential surfaces between said top and bottom surfaces, wherein said top surface is connected to said top annular plate and said bottom surface is connected to said bottom annular plate, and wherein a first length is defined between said top and bottom surfaces and a second length is defined between said inner and outer circumferential surfaces.

29. A railway car side bearing according to claim 28 wherein said elastomeric spring has an unbuckled condition providing a first set of spring rates over a selected first range of axial loads and a buckled condition providing a second set of spring rates over a selected second range of axial loads, wherein said spring rates within said second set are softer than said spring rates within said first set.

30. A railway car side bearing according to claim 29 wherein said spring rates within said second set are softer than said spring rates within said first set by a factor of at least three.

31. A railway car side bearing according to claim 29 wherein said buckled condition occurs when a ratio of said first length to said second length is greater than about 2.

* * * * *